Patented Feb. 12, 1924.

1,483,270

UNITED STATES PATENT OFFICE.

FRANK E. BARROWS, OF UPPER MONTCLAIR, NEW JERSEY.

COMBINED SULPHIDATION AND FLOTATION OF ORES, ETC.

No Drawing. Application filed January 24, 1917, Serial No. 144,116. Renewed May 24, 1923.

*To all whom it may concern:*

Be it known that I, FRANK E. BARROWS, a citizen of the United States, residing at Upper Montclair, county of Essex, State of New Jersey, have invented certain new and useful Improvements in Combined Sulphidation and Flotation of Ores, Etc.; and I do hereby declare the following to be a full, clear, and exact description of the invention, such as will enable others skilled in the art to which it appertains to make and use the same.

This invention relates to the combined sulphidation and flotation of ore pulps, slimes, and other metal-containing materials, and particularly to the concentration, by flotation, of ores of a non-sulfide nature.

The common methods of effecting the flotation of sulfide ores involve an indiscriminate separation of sulfides from gangue, the whole sulfide constituents of the ore, or certain sulfide constituents thereof, being floated as a froth by the combined action of air and a flotation agent. The common methods of flotation are, so far as I am aware, limited to sulfide ores, and are not applicable generally to non-sulfide ores such as oxides or carbonates. Furthermore, when oxides or carbonates are present, admixed with the sulfides, the flotation of the sulfides takes place without the recovery of the oxides or carbonates, which are accordingly left with the gangue and lost. So also, where the sulfide ores have been partially oxidized, and where the oxidized surface film is dissolved for the purpose of exposing the fresh sulfide surface and permitting flotation, the dissolved oxidized constituents remain in the ore pulp and are lost.

It has been heretofore proposed to convert oxide and other non-sulfide ores into sulfides by treatment with hydrogen sulfide or other soluble sulfide, and thereafter to subject the resulting sulfidized ore to flotation.

I have found that, by treating non-sulfide metallic constituents, in solution, with a mixture of air and of hydrogen sulfide, the sulphidation of the metal constituents and the flotation of the sulfides formed can be effected in a single operation; and a coherent and permanent froth readily obtained.

I have further found that, from metal solutions which are free from gangue and other insoluble constituents, and which contain metals in solution which form insoluble sulfides, e. g., copper sulfide, the metal values can be recovered, even from very dilute solutions, by treatment of such solutions with a mixture of air and hydrogen sulfide, so that the metal will be precipitated from its solution as sulfide and the sulfide will be floated in the form of a froth and thereby recovered in a concentrated form from the dilute solutions. Thereby, the precipitation of the metal within the dilute solution, and the filtration of the precipitate, are made unnecessary, and the precipitation and separation are effected in a single operation.

Where the ore pulps contain metal values in solution, the treatment of such ore pulps with a mixture of air and hydrogen sulfide makes it possible to recover the dissolved metal values in the form of a froth at the same time that other constituents of the ore are being recovered. It is thereby possible to effect the combined sulphidation and flotation of dissolved constituents of the ore pulp, either as a separate operation in the recovery of such constituents, or as a modification of the common methods of effecting flotation where such dissolved constituents are unaffected by the flotation and are therefore lost. With respect to ore pulps containing such dissolved constituents, the recovery of which normally would require sulphidation prior to flotation, or would require removal from the ore pulp by filtration, subsequent precipitation and a second filtration, the combined sulphidation and aeration of the present invention enables the complete recovery to be effected in a single operation.

The nature and advantages of the invention will more readily appear from the following specific application:

A suitable mixture of air and hydrogen sulfide is blown, in a finely divided condition, through a receptacle containing copper in solution, as copper sulfate. A black froth of copper sulfide is formed and continues to be formed, while the solution remains clear and unclouded. The air bubbles, as they rise through the solution, have a black or dark brown copper sulfide film formed thereon, so that the bubbles are clearly distinguishable as they rise through the solution. The froth continues to form and increases in amount, without discoloration of the solution, and can be removed by overflow or by skimming, or by other suitable means. Whereas the blowing of hydrogen sulfide alone into the solution results in immediate darkening of the whole solution by the precipitation of the copper sulfide therein without froth formation, the blowing of a suitable mixture of air and hydrogen sulfide through the solution results in froth formation without precipitation except on the contact surfaces of the solution with the gas bubbles.

Too much agitation may cause particles of the froth to be forced into the solution, but these particles seem to be of a flocculent or vesicular nature, which adapts them to be readily floated.

While I do not desire to limit myself by any theoretical explanation of the exact nature of the reaction which takes place, nevertheless, I believe this action to be due to the precipitation of the copper sulfide upon the surface film of the air bubble without solution or penetration of the hydrogen sulfide into the body of the solution beyond the precipitate. Thereby, the copper sulfide film is formed in actual contact with the gas bubbles, and, even where these bubbles burst upon reaching the surface of the body of liquid, the thin film of the sulfide, which is of a greasy nature, and which appears to be unwetted on the air bubble side, results in the production of a froth peculiarly adapted for flotation purposes without the use of oil. I have obtained a copper sulfide froth from copper solutions in the manner above indicated which remained for several days upon the surface of the body of liquid without discoloration of the liquid body and with only a partial breaking up of the air bubbles contained within the froth. The froth was nevertheless of a nature adapting it to be readily broken up by water spray or by mechanical means.

For the practice of the present invention, certain of the common types of apparatus are available for use without material change other than the provision of a suitable supply of hydrogen sulfide and of means for securing a proper mixture of the hydrogen sulfide and air.

The hydrogen sulfide may be generated in any suitable manner which will provide for a continuous supply of the necessary amount, or it may be produced and stored in suitable gas holders and supplied therefrom as required. Inasmuch as the flotation of ores commonly takes place at the mines, the hydrogen sulfide will, in practice, usually be produced from such cheap sulfur-containing materials as are there available, by methods which are familiar to those skilled in the art. The hydrogen sulfide and air can be suitably mixed to give the desired proportions, and this mixture can, in practice, take place continuously as desired, suitable mixers and regulators being provided for this purpose.

The proportions of hydrogen sulfide and of air can vary somewhat widely. It will usually be desirable to use sufficient air so that the hydrogen sulfide will not be dissolved to an extent which will cause precipitation of the sulfide without flotation. In treating solutions containing copper as copper sulfate, I have obtained good results with mixtures varying from about one part of hydrogen sulfide to one part of air to one part of hydrogen sulfide to eight or ten or more parts of air. It seems generally advisable to use more air than hydrogen sulfide, usually several times as much, particularly where the values to be recovered are small in amount.

Where the gaseous mixture is passed through the ore pulp or other body containing the metal values to be recovered, and the hydrogen sulfide is not all absorbed, the apparatus can be suitably enclosed by the provision of a suitable cover, and the escaping gases returned and reused with further additions of hydrogen sulfide. So also, where the froth is collected in separate receptacles and is there broken up, these receptacles may be provided with covers and the escaping gases may be led back to be used in the treatment of further charges of the material.

In practicing the novel method of the present invention without the use of oil, it is desirable that the body of ore pulp or other material treated should not be subjected to too violent agitation which would cause the breaking up of the air bubbles and the absorption of hydrogen sulfide and the formation of finely-divided sulfide precipitates within the body of the material. The Callow cell, in which the aeration is effected by blowing finely-divided air into the bottom of the cell, is well adapted for the practice of the present invention. With this apparatus, the mixture of air and of hydrogen sulfide is forced through the ore pulp in much the same manner as air as now used.

In treating certain oxide ores, such as some copper oxide ores, a suitable amount of acid can, with advantage, be added. This acid seems to act as a temporary or transitory or catalytic solvent, causing a partial solution of the copper oxide and being regenerated upon the precipitation of the sulfide, so that the acid will be repeatedly regenerated and made available for dissolving further constituents. Inasmuch as only surface sulphidation of oxide particles is necessary, the presence of such small amounts of acid are of value in promoting the desired sulphidation where aeration takes place at the same time, by the combined use of air and hydrogen sulfide.

Where the ore treated is a mixture of sulfides and oxides, such as the porphyry ores, the oxide constituents, either in solution or partly in solution and partly in suspension, can be to a greater or less extent recovered at the same time as the sulfides, whereas, according to methods now utilized, the non-sulfide constituents are usually lost in the tailings.

Where the sulfide constituents have previously been removed from the ore pulps or other materials, by flotation, the resulting tailings containing oxidized constituents in solution can be subjected to a subsequent flotation with the mixture of air and hydrogen sulfide and further recoveries of the oxidized constituents effected.

Having thus described my invention, what I claim is:

1. The method of effecting the flotation of non-sulfide metal values from ores, slimes, and other metal-bearing materials which comprises subjecting such materials containing values in solution to the combined sulfidizing and flotation action of a mixture of hydrogen sulfide and air; substantially as described.

2. The method of erecting the flotation of non-sulfide metal values from ores, slimes, and other metal-bearing material, containing such values in suspension, which comprises adding an acid to dissolve such non-sufide values and subjecting the resulting pulp containing values in solution to the combined sulfidizing and flotation action of a mixture of hydrogen sulfide and air; substantially as described.

3. The method of recovering metal values from solutions containing them, which comprises introducing into such solutions bubbles of a mixture of air and hydrogen sulfid containing these gases in such proportions that the metal values are precipitated from solution and form a coating of sulfid on such bubbles, and separating the resulting coated bubbles as a froth.

4. The method of recovering values from ore pulps containing non-sulfid constituents, which comprises dissolving such constituents with an acid, and introducing into the pulp containing the dissolved values bubbles of a mixture of air and hydrogen sulfid in such proportions that the metal values are precipitated from solution on the bubbles, and separating the resulting coated bubbles as a froth.

5. The method of recovering copper as copper sulfid from ore pulps containing copper in solution, which comprises introducing into the pulp bubbles of a mixture of air and hydrogen sulfid in such proportions that the copper will be precipitated as sulfid on the bubbles and separating the resulting coated bubbles as a froth.

6. The method of effecting the flotation of minerals from ore pulps containing values in solution which comprises introducing into the ore pulp bubbles of a mixture of air and hydrogen sulfid in such proportions that the hydrogen sulfid will precipitate the values as sulfids on the bubbles without any appreciable amount of hydrogen sulfid otherwise going into solution in the pulp, and separating the resulting bubbles as a froth.

In testimony whereof I affix my signature, in presence of two witnesses.

FRANK E. BARROWS.